Patented Feb. 7, 1933

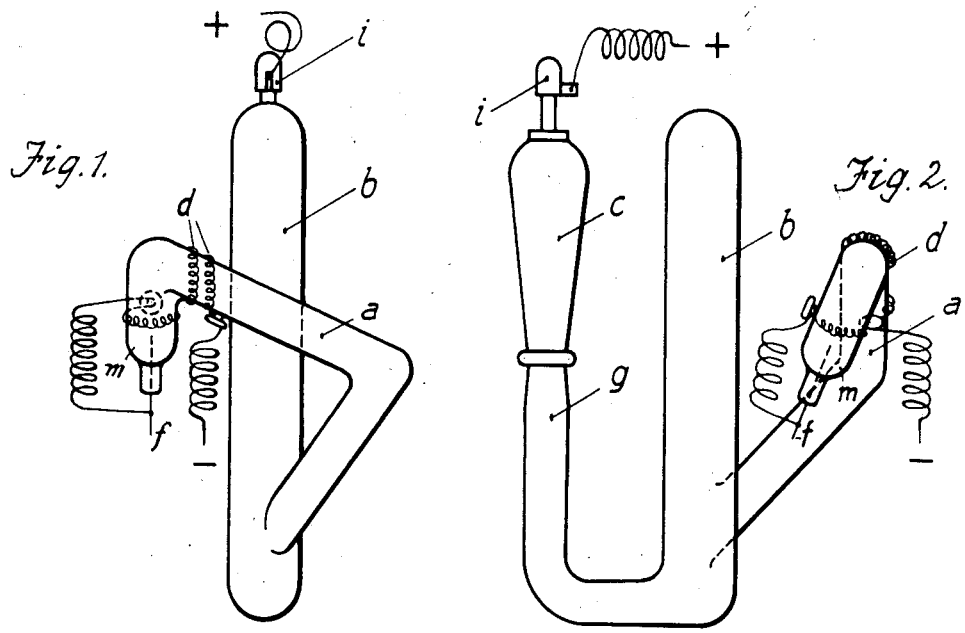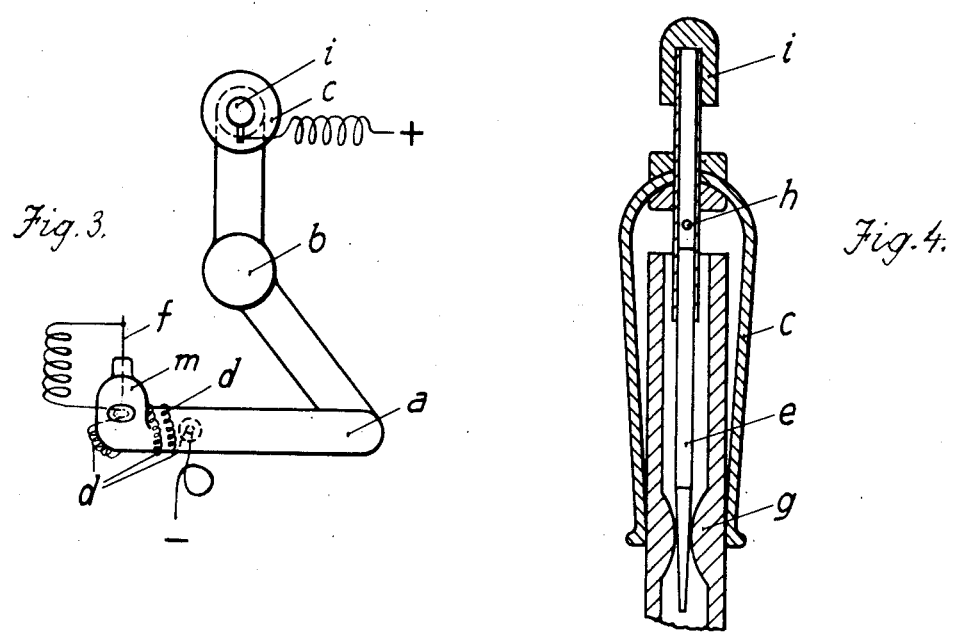

1,896,651

UNITED STATES PATENT OFFICE

FELIX RITTER KALBACHER v. TÜRKENBURG, OF BERLIN-MAHLSDORF, GERMANY

MERCURY VAPOR LAMP

Application filed September 4, 1930, Serial No. 479,672, and in Germany December 20, 1929.

Mercury vapour lamps in which the light arc is generated by partially vaporizing the mercury, are well known; these burners, however, have a series of disadvantages.

To regulate the light arc the burner is provided at each of its extremities or ends with a capillary or throttle. Therefore, the regulation that must be finely measured is time-absorbing and difficult and with slight inaccuracies a wandering of the light arc takes place, whereby the extinction of the light is effected.

Lamps of this kind cannot be transported without the danger of air or impurities entering the burner and disturbing its function. On the other hand, a spilling of mercury is easily possible.

Furthermore, the mercury is exposed to the influence of the air and its oxidation prevents the generation of the light. Finally, the vapours of mercury are noxious to the health of the patients.

To avoid all these inconveniences, the use of the vacuum-burners has been preferred, the manufacture of which, however, is extremely difficult and costly, not to mention that the output of the vacuum-burners is, as is well known, far inferior to that of the atmospheric type.

The present invention shows a lamp doing away with the deficiencies above cited.

The burner is completely filled with mercury and works under the influence of the atmospheric pressure, while the anode leading-in conductor is formed as a deformable receiver, which takes up the mercury displaced by the light arc. The light arc, therefore, is under atmospheric pressure increased by the pressure which the stretched receiver exerts.

In order to permit of the use of a deformable receiver, the burner is furnished with a circulation cooler, which reduces the temperature of the mercury, which has been raised by the light arc to such an extent that rubber can be used as the material of the receiver.

As the mercury filling is isolated from the outer air, impurities and losses of mercury cannot occur. Damage of the burner through oscillation of the mercury during transport, as can easily occur in vacuum lamps which are only partly filled with mercury or in lamps partly filled with gas, is prevented, because the burner is completely filled with mercury.

The new lamp has only one capillary, which is lead through the anode leading-in conductor, secured to the deformable receiver, so that the length of the light arc is held constant.

Through the use of deformable receivers of different thicknesses of wall, the lamp works under pressure considerably higher than atmospheric. For this reason the insuperable difficulties, peculiar to vacuum—permanent gas-tight molten joints of the anode and cathode leading conductors—are removed. The new lamp only has one molten joint on the cathode side. As cathode leading-out conductor a usual wolfram molten joint suffices as the mercury itself closes off without objection.

The accompanying drawing shows an execution of which:—

Fig. 1 is a front elevation;
Fig. 2 is a side elevation;
Fig. 3 is a plan view of Fig. 1; and
Fig. 4 is a section through a bellows of a mercury receiver.

$a$ indicates the arc tube, $b$ a vertically arranged cooler, $c$ is a bellows or receiver, $e$ the anode leading-in conductor and $f$ the cathode leading-out conductor.

The new burner is of the atmospheric pressure type. It is completely filled with mercury. At the cathode-end it is closed, while the anode-end is equipped with an air-proof bellows of rubber or the like which is secured to the quartz tube. The anode leading-in conductor $e$ is movably fastened in the bellows whereas the cathode leading-out conductor $f$ is rigidly molten into the closed end of the burner tube. The anode leading-in conductor is hollow at its upper part and ends in a conical needle moving in the reduced cross-section or capillary $g$ of the tube. In order to fill the burner with mercury a hole or aperture $h$ and a closing nut $i$ is provided.

To vaporize the mercury, viz., to generate the light arc, a heating coil $d$ is provided, being arranged at the cathode-end of the burner tube which is bent angularly downwardly.

Now by partially vaporizing the mercury the liquid part of it is, by the tension of the vapour, repulsed or displaced as the bellows c serves as a deformable receiver.

By using bellows of different dimensions burners can easily be manufactured for different, especially high pressures of the mercury vapour.

These burners are adapted in the like manner for polyphase currents. In this case, the number of burners is equal to the number of phases.

The cathode leading-out conductors are laid on a common conductor, the null conductor of the polyphase current, the anode leading-in conductors on the other hand on the individual phases.

Naturally such lamps can also be used for equalizing the direction of alternating currents (Cooper Hewitt).

In order to ensure an absolutely correct function it is necessary that the cathode-end is constantly kept hot enough to exclude any condensation of the mercury vapour, whereas the anode-end of the burner must be permanently cooled. For this reason, a vertical circulation cooler is arranged so that the anode-side is connected to the bottom thereof and the burner-tube to a point somewhat higher, as shown in Fig. 1. The cooling surface is chosen large enough to establish or start a current of heat. The hot mercury, therefore, rises in the cooler and the cooled mercury is gathered at the bottom. As a consequence of the high efficiency of the cooler the employment of a bellows of rubber is rendered possible.

Now, when switching in, the current passes through the mercury, heats the coil and a partial vaporization takes place. Corresponding to the length of the light arc generated, respectively to the quantity of mercury displaced by the pressure of the mercury vapour, the anode leading-in conductor e is lifted by reason of the extension of the deformable receiver, until a stable equilibrium or a state of permanence between the tension of the vapour and that of the receiver is obtained with the result of a light arc without oscillation.

I claim:—

1. Mercury vapour lamp comprising a closed cathode, an anode, a burner tube joining said cathode and said anode, a vertical circulation cooler arranged between said cathode and said anode, means mounted on said anode for automatically taking up the mercury displaced by the light arc and, after extinction of the latter, for automatically returning the said mercury to the burner tube under co-operation of the outer atmospheric pressure, means for completely filling the lamp with mercury and means for partially vaporizing the mercury.

2. Mercury vapour lamp comprising a closed cathode, an anode, a burner tube joining said cathode and said anode, a vertical circulation cooler arranged between said cathode and said anode, a closed deformable receiver mounted on said anode, a capillary in said anode, a hollow anode leading-in conductor passing through said deformable receiver and said capillary, means for completely filling the lamp with mercury and means for partially vaporizing the mercury.

3. Mercury vapour lamp comprising a completely closed cathode, a downturned end to said cathode, an anode, an angled burner tube joining said cathode and said anode, a vertical circulation cooler arranged between said cathode and said anode, a connection between anode and circulation cooler at the bottom of said vertical circulation cooler, a connection between burner tube and circulation cooler at a point above the connection thereof with the anode, means mounted on said anode for automatically taking up the mercury displaced by the light arc and, after extinction of the latter, for automatically returning the said mercury to the burner tube under co-operation of the outer atmoshperic pressure, means for completely filling the lamp with mercury and means for partially vaporizing the mercury.

4. Mercury vapour lamp comprising a completely closed cathode, a downturned end to said cathode, an anode, an angled burner tube joining said cathode and said anode, a vertical circulation cooler arranged between said cathode and said anode, a connection between anode and circulation cooler and the bottom of said vertical circulation cooler, a connection between burner tube and circulation cooler at a point above the connection thereof with the anode, a closed deformable receiver mounted on said anode, a capillary in said anode, a hollow anode leading-in conductor passing through said deformable receiver and said capillary, means for completely filling the lamp with mercury, and means for partially vaporizing the mercury.

5. Mercury vapour lamp comprising a completely closed cathode, a downturned end to said cathode, an anode, an angled burner tube joining said cathode and said anode, a vertical circulation cooler arranged between said cathode and said anode, a connection between anode and circulation cooler at the bottom of said vertical circulation cooler, a connection between burner tube and circulation cooler at a point above the connection thereof with the anode, a closed deformable receiver mounted on said anode, a capillary in said anode, a hollow anode leading-in conductor passing through said deformable receiver and said capillary, an aperture in said leading-in conductor, a conical end to said leading-in conductor, and means for partially vaporizing said mercury.

6. Mercury vapour lamp comprising a completely closed cathode, a downturned end to said cathode, an anode, an angled burner tube joining said cathode and said anode, a vertical circulation cooler arranged between said cathode and said anode, a connection between anode and circulation cooler at the bottom of said vertical circulation cooler, a connection between burner tube and circulation cooler at a point above the connection thereof with the anode, a closed deformable receiver mounted on said anode, a capillary in said anode, a hollow anode leading-in conductor, passing through said deformable receiver and said capillary, an aperture in said leading-in conductor, a conical end to said leading-in conductor, and a heating coil surrounding the cathode.

In testimony whereof, I have affixed my signature.

FELIX RITTER KALBACHER v. TURKENBURG.